Figure 1:
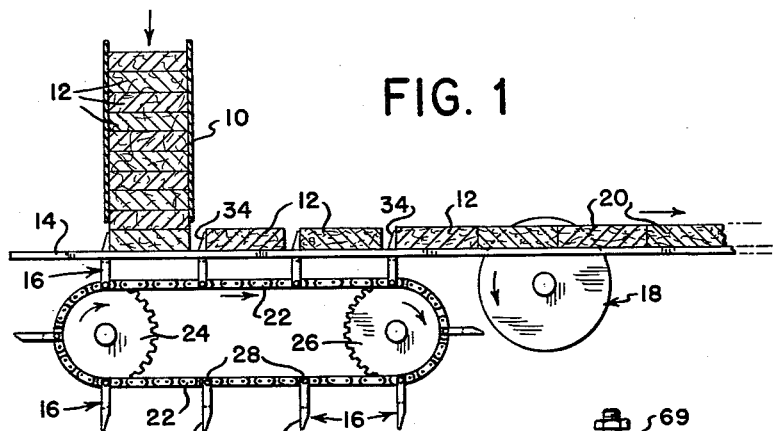

March 5, 1963  C. G. OLDERSHAW  3,079,964
FROZEN FISH BLOCK CUTTING AND ALIGNING MACHINE
Filed March 26, 1959  3 Sheets-Sheet 1

INVENTOR
CHARLES G. OLDERSHAW

March 5, 1963  C. G. OLDERSHAW  3,079,964
FROZEN FISH BLOCK CUTTING AND ALIGNING MACHINE
Filed March 26, 1959  3 Sheets-Sheet 2
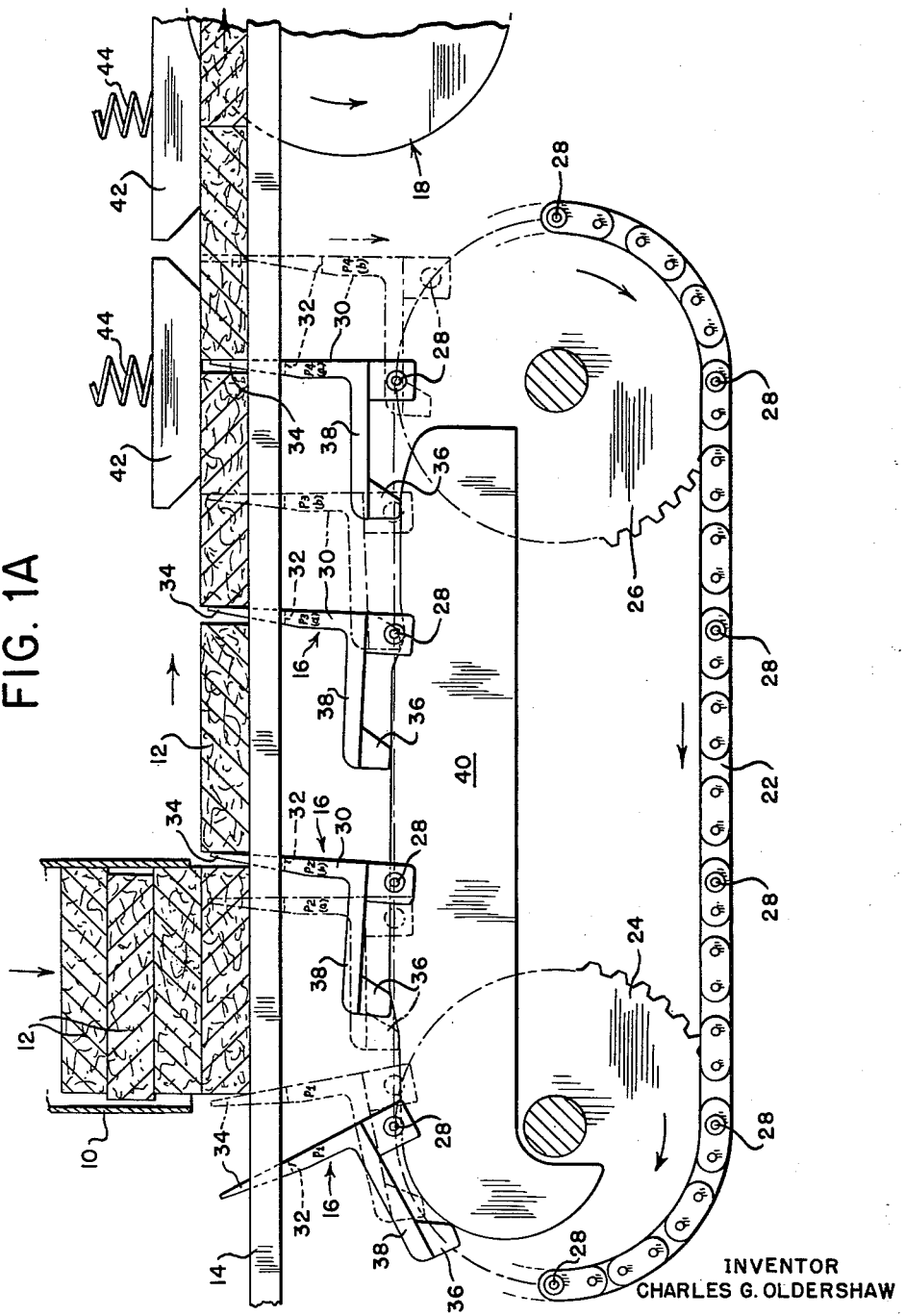
INVENTOR
CHARLES G. OLDERSHAW March 5, 1963     C. G. OLDERSHAW     3,079,964
FROZEN FISH BLOCK CUTTING AND ALIGNING MACHINE
Filed March 26, 1959     3 Sheets-Sheet 3

INVENTOR
CHARLES G. OLDERSHAW

BY

ATTORNEY

United States Patent Office 3,079,964
Patented Mar. 5, 1963

3,079,964
FROZEN FISH BLOCK CUTTING AND
ALIGNING MACHINE
Charles G. Oldershaw, Albion, N.Y., assignor to General
Foods Corporation, White Plains, N.Y., a corporation
of Delaware
Filed Mar. 26, 1959, Ser. No. 802,081
6 Claims. (Cl. 146—98)

In the commercial production of fish sticks, it is common practice to reduce relatively large rectangular solid blocks of frozen fish flesh to relatively small "sticks" by a progression of sawing operations, using bandsaws, reciprocating saws, circular saws, or, usually, a combination of these. One commonly used method is to cut the blocks into thin strips with bandsaws; then to cut these strips in a final cutting strip into individual "sticks" with circular gang saws. Also, it has been demonstrated that the processing of the frozen sticks into battered, breaded, deep fat fried sticks is materially improved if the sticks, discharged from these saws, are set out on the processing machine conveyor belts in a regular, close-order pattern, as compared to a haphazard distribution. This distribution is now accomplished by setting the sticks manually into fixed grooves or channels above the conveyor belts.

This invention is concerned with improvements in the method and apparatus for cutting such sticks and aligning them preparatory to battering, breading, and drying. More particularly, the invention is concerned with improvements in the design of the circular gang saws used in the last cutting step, and also with a means for automatically aligning the cut sticks and distributing them, lying them on their sides, in a regular close-order pattern on processing conveyor belts.

Briefly, whereas existing gang saws use a reciprocating motion, developed by a cam mechanism or by fluid powered pistons, to advance the strips from a feed magazine and impel them intermittently through the rotating saws, the present design pushes the strips, in an essentially continuous motion, from the bottom of a magazine into rotating circular gang saws. This is done by mounting slotted push bars on a continuous chain under the saw table in such a manner that the upper part of the push bars protrude up through the saw table to engage the strips and then push them toward the saw. The chief advantages of continuous over intermittent feed are that a continuous feed permits slower travel of the rectangular blocks of frozen fish flesh through the saws, and eliminates the large fluctuation of load on the saws.

The second step in the process comprises separating the sawed sticks into two layers, upper and lower, as they are discharged from the circular saws. This is accomplished by having the sticks, as they leave the saws, enter a series of vertically divergent channels in a separator. The sticks enter the separator while still engaged partly in the saws, and thereby are retained in proper alignment. By travelling in alternate upward-sloping and downward-sloping channels, adjacent sticks are separated from one another, and are thus prevented from freezing together after leaving the saws. Up to the discharge end of this vertical separator, forward motion is imparted to the sawed sticks by the saw feed push bars.

Means in the final stage of the operation tilt the sticks in both layers onto ther sides, and recombine the two layers into one. While being carried forward on upper and lower flexible belts, the sticks are turned by means of deflectors in channels above the belts. Preferably the deflecting or turning channels are so arranged that sticks from the upper channels are all deflected toward one side of the upper conveyor belt and sticks from the lower channels are all deflected toward the other side of the lower conveyor belt. As an alternative, the channels may be so arranged that sticks from the lower belt occupy every second channel, while sticks from the upper belt are deposited into the unoccupied channels as they drop from the upper belt onto the lower belt. The channels over the lower belt are extended to maintain the stick pattern on the conveyor belt of the next process machine.

Thus, the invention broadly stated employs stick cutting and aligning apparatus comprising in combination a plurality of parallel spaced saws, means for continuously pushing strips of cuttable material through said saws to produce a plurality of rows of close-order sawed sticks, means for separating said sticks from their close-order arrangement comprising at least two series of vertically divergent channels at different levels so that one series of rows of sticks is disposed above the other, conveyor means extending from each channel at the level of each series of rows of sticks, means in the path of sticks issuing from said channels operative to turn the sticks on their sides as they are moved by said conveyor means, and means for recombining the turned sticks into close-order aligned relation.

Figure 2:
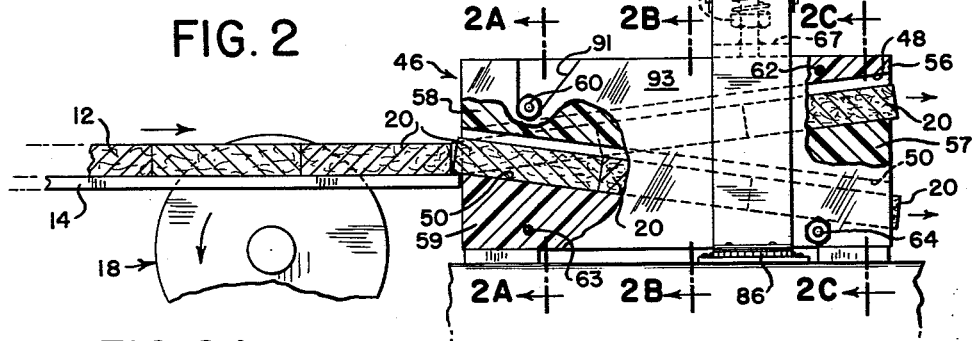
Figure 2A:
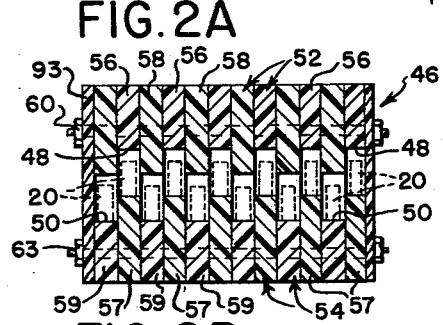
Figure 2B:
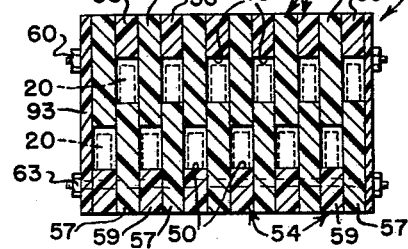
Figure 2C:
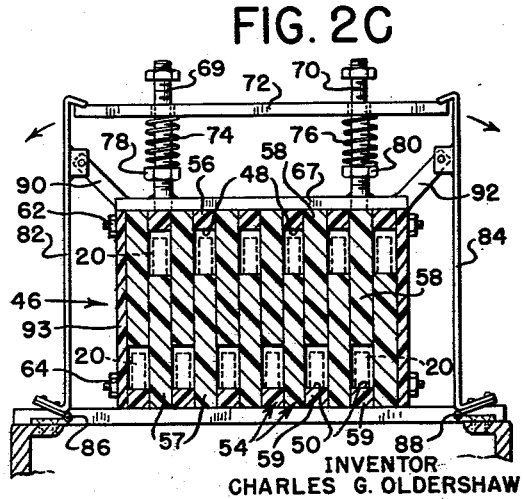
Figure 3A:
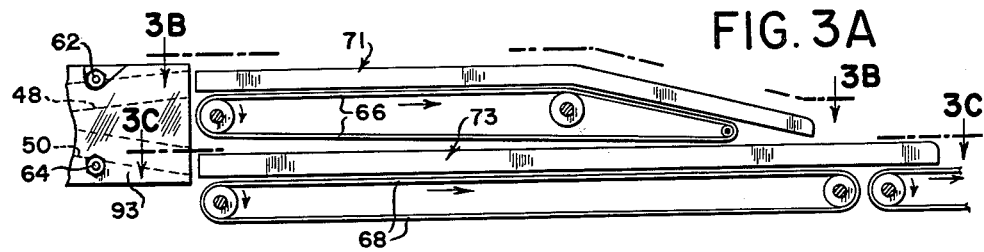
Figure 3B:
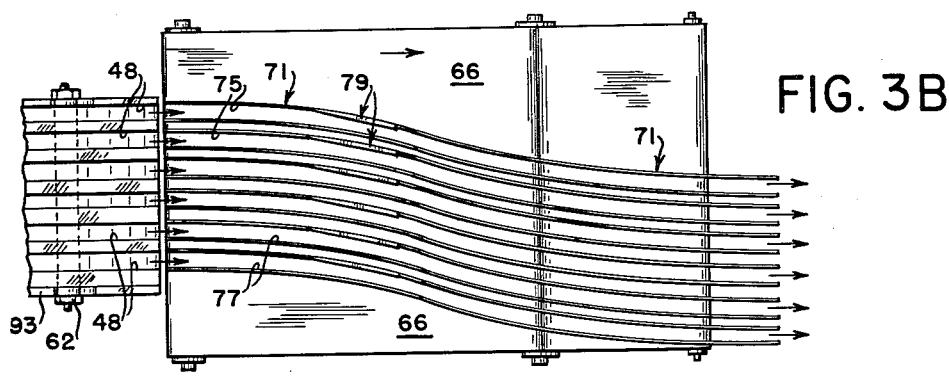
Figure 3C:
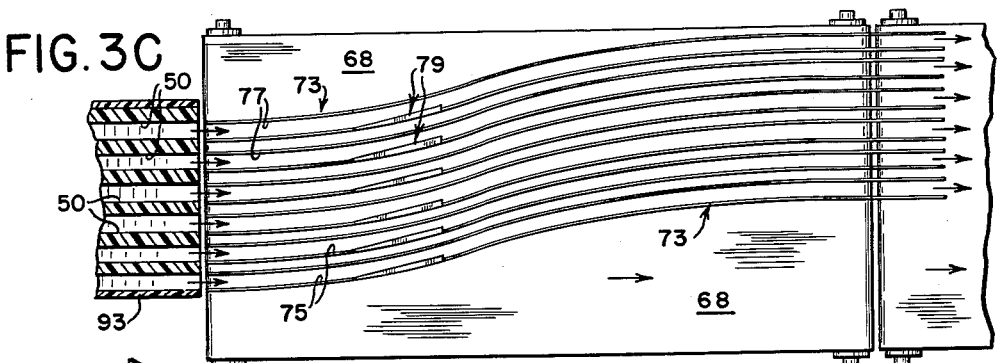
Figure 4:
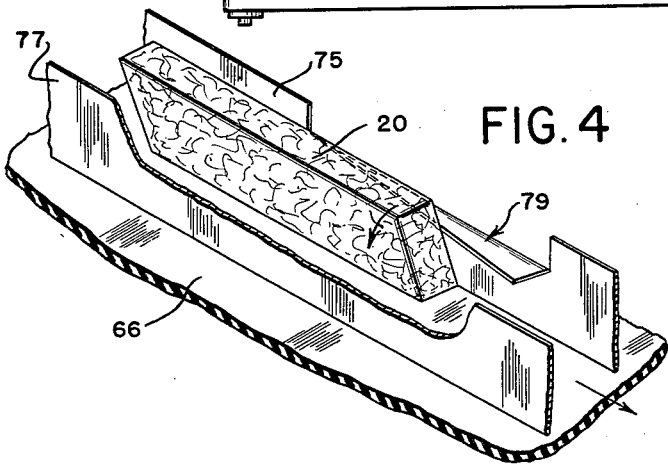

The invention is illustrated in the drawings wherein FIG. 1 is a schematic side view, partly in section, of the stick cutting mechanism and the means for advancing strips of frozen fish flesh from a feed magazine to a saw; FIG. 1A is an enlarged side view, partly in section, of the strip advancing means in FIG. 1; FIG. 2 is a schematic side view, partly in section and with parts broken away, of the stick separator; FIGS. 2A, 2B, and 2C are sections on lines 2A—2A, 2B—2B, and 2C—2C in FIG. 2; FIGS. 3A, 3B and 3C are schematic side and top views, respectively, of the final stage of the operation, FIGS. 3B and 3C being taken on the lines 3B—3B and 3C—3C of FIG. 3A and showing the upper and lower belts respectively; and FIG. 4 is a schematic perspective view of stick-tilting means.

Referring to the drawings, and more particularly to FIG. 1, the saw feeding assembly comprises a strip magazine 10 containing superposed relatively large rectangular solid blocks of frozen fish flesh 12. Strips 12 are deposited on a saw table 14 from the bottom of the strip magazine 10. Strips 12 are advanced by push bars shown generally at 16 which, as explained hereinafter, engage the strips 12 and push them forward with a continuous motion, which will be more fully described hereinafter, toward a plurality of circular gang saws generally shown as 18, the blades of the gang saws being driven in substantially parallel planes and spaced from one another a distance corresponding to the eventual thickness of the fish sticks 20 producd. It will be seen from FIG. 1 that the strips 12 and the sticks 20 produced therefrom are arranged throughout their movement on the saw table in substantially regular and aligned close-order. The strips 12 passing between the gang saws 18 abut one another and by means shown in FIG. 1A are sawed in this abutting relationship in a manner which eliminates any troublesome crushing or breaking of edge portions of the strips.

In FIG. 1A, it will be seen that the push bars 16 are mounted on an endless chain 22 driven by sprockets 24 and 26. Each push bar is pivotally mounted on chain 22 as at 28 and is spaced from preceding and following push bars by a distance sufficient to permit receipt of strips between their strip engaging flange portions 30 which are slotted at 32 to permit their free edge portions 34 to pass upwardly through slots in saw table 14. A cam follower 36 mounted on the trailing flange portion 38 of push bar 16 engages the surface of cam 40 suitably affixed beneath the saw table. A plurality of holddown plates 42 suitably spring loaded on the frame of the machine through the intermediation of springs 44 engage the top surfaces of strips 12 advanced by push bars 16 in the direction of the saws 18 and confine the strips to move over the surface of saw table 14 so that the strips are enclosed as they approach the saws and travel through the saws, the underface of the holddown plate 42 located over the saws 18 being slotted to accommodate the cutting edge of circular saws 18.

It will be noted that the surface of cam 40 is such that the cam follower 36 of each push bar causes the flange portion 30 thereof to rock backward and forward as the strips are advanced in the direction of the gang saws 18. Thus, in position 1 of FIG. 1A designated P1, cam follower 36 allows the strips to be deposited on the saw table and as the push bar is advanced, the free edge portion 34 engages the strip at a slight angle whereafter the cam follower 36 rides upwardly in position P2(b) to rock free edge portion 34 fully to allow clearance for depositing successive strips before the next succeeding push bar. As the push bar moves along to position P3(b), the cam follower 36 causes the free edge portion 34 to rock backwardly over a short span, thereby relieving part of the pressure employed to push the strip forward to assure that reaction force from the rotating saws is reduced; this avoids crushing of soft melted edge portion of the strips of frozen fish flesh stemming from any impact transferred from strip to strip, the strips being moved throughout with a continuous motion and in fixed close-order relationship to one another from position P3(a) onward. As the push bar 16 moves through position P3(b) to P4(a), it passes a point on the cam 40 where it is caused to ride gradually downwardly along a path designed to assure that the forward engaging edge of the push bar's free edge portion 34 is vertical and flushly engages the fish strip; at the same time, the free edge portion 34 descends from between adjacent successive strips until it is in position P4(a). As the push bar 16 moves from position P4(a) to P4(b), the complete withdrawal of the free edge portion 34 from between the strips 12 is effected, and during this interval the push bar 16 rides idly between adjacent strips, this withdrawal being effected gradually over a gradually reduced clearance between strips by reason of the taper on the trailing face of the free edge portion 34.

While the position of one push bar 16 is being changed as it rides through the dwell on the cam at position P3(a) and assumes the position illustrated at P3(b), the push bar 16 next ahead in the direction of travel is being gradually withdrawn from the gap between advancing fish strips, the gap between adjacent strips being gradually diminished until they abut one another at position P4(b). The purposes of this motion are to maintain a positive and continuous progression of strips through the cutting saws while, at the same time, withdrawing the push bars from the gaps between closely arranged advancing strips in such a gradual fashion as will avoid crushing of edge portions of the strips. By reason of this, the reaction from circular gang saws 18 is gradually transmitted such that crushing of the strips is avoided, such gradual transmission being assured by the positive action of holddown plates 42 urging the strips against the saw table 14.

Referring to FIGS. 2, 2A, 2B and 2C, the sticks 20 pass from the saw table 14 into a stick separator generally shown as 46, wherein the sticks are caused to travel in close-order spaced rows, adjacent rows being caused to diverge vertically from one another. During passage through the stick separator 46, the sticks are advanced in close-order abutting relationship to one another with with a continuous motion.

The stick separator comprises a series of upwardly directed channels 48 and downwardly directed channels 50, which channels are defined by upper and lower sections 52 and 54 respectively, preferably composed of plastic sheets (e.g., an acrylic resin such as Lucite) bolted together, the upper and lower sections having a plurality of vertically spaced wedge-shaped wall portions 56, 57, 58 and 59, respectively, developing the upwardly inclined channels 48 and the downwardly inclined channels 50 in separator 46, adjoining wall portions 56 and 58 being bolted together by bolts 60 and 62 and adjoining wall portion 57 and 59 being bolted together by bolts 63 and 64.

Preferably, the entrance to the stick separator 46 is located proximate circular saws 18 in order that the front ends of sticks 20 will enter the channels 48 and 50 before the fish of strips 12 leave the saws 18 as sticks 20. Cut sticks of frozen fish flesh have a tendency to weld together after passage from the circular gang saws and by entering into the channels 48 and 50 this tendency is reduced by reason of the changing direction of adjacent sticks as they pass into divergent paths along channels 48 and 50. As the sticks move along channels 48 and 50 adjacent sticks diverge vertically from one another until they issue from the stick separator 46 at two levels one above the other and are deposited upon conveyor means shown in FIGS. 3A, 3B and 3C. Here again, tendency for abutting sticks to weld to one another is avoided by the change in direction that takes place as the fish sticks emerge from the sloping channels 48 and 50 of the stick separator and are deposited on the horizontal conveyor belts 66 and 68.

As indicated previously, the sticks in each row abut one another and move in a continuous fashion from the saws 18 through the stick separator 46. In production it can happen that there is jamming in the upper or lower or both conveyors 66 and 68 such that the ability of sticks to proceed along the inclined paths of channels 48 and 50 in stick separator 46 is curtailed; this causes jam ups in the stick separator which would require shutdown of the operation until the channel ways were clear. In order to eliminate this possibility means are provided whereby, in the event of jamming in the stick separator, separator sections 52 and 54 will separate and open channels 48 and 50 automatically. This safety feature of the stick separator is very important since, in signalling the occurrence of jamming of sticks, production can be temporarily stopped, thereby avoiding jamming of the saws and also assuring that undue crushing of sticks being processed will not occur. In addition, minor variations in stick size can occur due to occasional uncontrollable variations in the size of the strips of frozen fish flesh. Means are therefore provided to compensate for such minor variations in a fish which will not result in jamming in the stick separator and interruption of an otherwise high production rate.

Thus, separator sections 52 and 54 are resiliently mounted with respect to one another to compensate for minor variations in the size of sticks passing through the separator and to cause sections 52 and 54 to separate when a troublesome jamming takes place. As shown in FIGS. 2 and 2C such means comprise a pressure plate 67 having vertical bolts 69 and 70 integrally mounted thereon and passing freely through holes in cross-plate 72 which in turn is resiliently supported under adjustable spring pressure by springs 74 and 76 located between the underface of cross-plate 72 and adjusting nuts 78 and 80. A pair of hooks 82 and 84 engage the lateral upper extremities of cross-plate 72 and the lower extremities of hooks 82 and 84 pivot freely about hinges 86 and 88 mounted on the frame of the machine. Tripping arms 90 and 92 pivotally mounted on hooks 82 and 84 embrace the edges of pressure plate 67.

To permit the upper section 52 to move upwardly a slight amount the free ends of each tripping arm 90 and 92 are provided with a loose fit with respect to the corners of the pressure plate 67 such that the pressure plate can move upwardly and downwardly under spring tension while loosely holding separator segments 52 and 54 together, guide means in the form of a cut-away seat 91 of plate 93 being provided to assure that bolt 60 for section 52 is constrained to move in a generally vertical direction with respect to separator section 54. In the event undue jamming occurs in the channel of the stick separator the segment 52 moves pressure plate 67 upwardly causing tripping arms 90 and 92 to rotate hooks 82 and 84 to a point where the latter's free ends disengage the ends of cross-plate 72 thereby releasing the yielding pressure of the springs acting to hold the separator segments 52 and 54 together. At this point, the stick separator can be dissembled and the sections 52 and 54 cleared of any stick fragments, whereafter the operation can be resumed by reassembling and rehooking sections 52 and 54.

As seen in FIGS. 3B and 3C sticks 20 issuing from channels 48 and 50 are caused to move into engagement with deflectors 79 in upper and lower channels generally shown as 71 and 73, respectively. As shown in FIG. 4 stick deflectors 79 serve to tilt the sticks on their sides as they travel between spaced channel walls 75 and 77 by conveyor belts 66 and 68. As seen in FIG. 3B, sticks emerging from the upwardly inclined series of channels 48 are all deflected to one side of the upper conveyor belt 66 whereas sticks emerging from the lower series of channels 50 (FIG. 3C) are moved to the other side of the lower conveyor belt 68 under the control of channel sides 75 and 77 of the respective channels for each row of sticks. To turn individual sticks on their sides plows or deflectors generally shown as 79 project into the paths of sticks travelling between the walls of channels 71 and 73. In general, these plows are wedge-shaped and extend gradually into the path of travel of individual sticks. The tapering side of the plow engages the upper extremity of the stick. Each plow is located on the channel wall along which the stick would ordinarily slide as it is being deflected between the sides of the respective deflecting channels.

To reestablish a close-order pattern in a single plane from the spaced rows of sticks at the upper and lower levels provided by the conveyor belts 66 and 68, the terminal sides of the individual deflector channels are eventually aligned in parallel relation such that the upper conveyor belt slopes downwardly and deposits sticks adjacent to one another. Thus, as each row of sticks from the upper belt is deposited on the lower belt spaced rows of sticks are rejoined with one another in a comparatively close-order pattern which assures maximum use of battering and breading materials as the aligned sticks are transferred to subsequent battering and breading and frying operations.

Although the present invention has been described by references to frozen cuttable materials, specifically, frozen fish flesh, it is equally adaptable to the handling of any cuttable material such as meats, the invention being ideally suited to the handling of frozen strips of fish fillets which are to be cut into sticks. By diversion of adjacent rows of advancing and abutting sticks into a series of spaced rows with one series located above the other, spaces are provided between rows of sticks such that they can be readily turned on their side and recombined with one another by mechanical means. In carrying out this operation, although a stick separator has been described wherein the channels diverge from one another in a vertical direction separators may be employed wherein the channels also diverge horizontally from one another to further separate the rows of sticks. Use of such a method and apparatus in combination with a continuous cutting by a plurality of saw means allows slower strip travel across the saws and occasions a minimum of waste in the form of powder or dust produced by the thinner cutting saws permitted. Thus, saws having cutting edges which are relatively thin can be employed by pushing the strips of cuttable material across their length through the saws and continuously moving this cuttable material into the separator where the strips entering are effectively separated without an undue amount of breakage, crushing, or deformation. By reason of the relative freedom from such deformation, crushing, or breakage uninterrupted and hence increased production speeds can be employed with resulting cost savings as well as improved yields and product uniformity. In the case of the cutting of frozen foods, typically frozen fish flesh, the frozen strips are subdivided and aligned continuously in such a fashion that they do not weld together although they are cut into a close-order relationship by the thin cutting edges used to produce a minimum of dust waste.

The separator assembly operates to compensate for variations in sizes and condition of product which can contribute to jamming and also automatically disengages the elements which are held together to define the separating channels so that any serious jamming condition can be immediately corrected when it takes place. As a result, production down time is at a minimum.

The plowing action offered by the tilting wedges or deflector means located in the channels communicating with the channels of the stick separator, in serving to consistently tilt the sticks, assures that they will be uniformly realigned and properly enrobed in subsequent operations. By employing a stick separator of the afore-stated type the sticks can be turned on their sides without contacting one another but without sacrificing valuable floor space, odd numbered sticks being diverted in one direction and even numbered sticks being diverted in another direction. Instead of a pair of vertically divergent channels more than two series of vertically divergent channels can be employed to deposit sticks of cut material at different levels whereon the sticks can be turned and from which the sticks can be realigned. This principle of separation is ideally suited to the production of sticks of frozen product which are arranged in close-order spaced relationship for economical use of enrobing material so that when the sticks are subsequently treated the enrobing batter or breading can be applied to the exposed sides of sticks and flow over the side edges of sticks to enrobe them without waste of enrobing material. On the other hand, the sticks are not too closely aligned to one another so that they do not weld or freeze together. In the present method of production, therefore, previously adjacent aligned rows of cut sticks at different levels can be rejoined with one another in a desirable undeformed uncrushed and close-order spaced aligned condition at high rates of production.

While the present invention has been described with particular reference to specific examples, it is not to be limited thereby, but reference is to be had to the appended claims for a definition of its scope.

What is claimed is:

1. Apparatus for cutting a succession of blocks of material to produce a transverse row of material sticks from each block and for aligning said sticks in transversely spaced lines, comprising supporting means, means for feeding said blocks to said supporting means and for orienting said blocks thereon transversely relative to their path of travel through the apparatus, a plurality of transversely separated sawing means spaced from said feeding means and located in the path of travel of said blocks on said supporting means, separator means for receiving sticks formed from said blocks by said cutting means and for vertically displacing adjacent lines of sticks to thereby prevent adherence between sticks in adjacent lines, conveying means engaging and positively moving said blocks from said feeding means to a point intermediate said feeding means and said sawing means at which point said conveying means disengages said blocks, said conveying means including means for moving said blocks with progressively decreasing spaces between adjacent blocks from said feed means to said point at which adjacent blocks come into engagement to form a continuous line of blocks ahead of said point and to move said line of blocks continuously through said sawing means and move said sticks through said separator means, and transporting means for receiving said sticks from said separator means and moving them to an advanced location for further processing.

2. Apparatus according to claim 1 wherein said separator means includes at least two series of diverging channels with adjacent channels diverging vertically.

3. Apparatus according to claim 2 wherein said channels include at least two opposed yieldably connected segments displaceable vertically relative to each other in response to variations in the vertical dimensions of successive sticks so as to correspondingly vary the vertical dimension of said channels.

4. Apparatus according to claim 3 wherein said separator means further includes means for releasing the yieldable connection between said segments to automatically open at least one face of said channels, said releasing means being rendered operative in response to vertical relative displacement between said segments exceeding a predetermined distance.

5. Apparatus according to claim 1 wherein said conveying means includes pusher members spaced from each other longitudinally a distance approximately equal to the longitudinal dimension of said blocks so that each pusher member will be in contact with the forward vertical face of one block and the rear vertical face of the preceding block, the longitudinal dimension of each pusher member diminishing from its base to its top, and means for moving said pusher members longitudinally from said feeding means to said intermediate point and for moving said pusher members downwardly relative to said support to gradually diminish the spacing between adjacent blocks until they are in abutting relation at said intermediate point.

6. Apparatus according to claim 1 wherein said transporting means includes a guide channel for each line of sticks leaving said separator means, said guide channels having a curved side wall portion for diverting the path of travel of said sticks, upsetting means on the side wall at the outside of the curve and located to engage the top portion of the surface of said sticks in contact with said outside side wall to thereby overturn said sticks on their side as they are advanced.

References Cited in the file of this patent

UNITED STATES PATENTS

| | | |
|---|---|---|
| 1,636,235 | Knowles | July 19, 1927 |
| 1,710,927 | Hume | Apr. 30, 1929 |
| 1,747,461 | Vaughan | Feb. 18, 1930 |
| 2,505,235 | Derbenwick et al. | Apr. 25, 1950 |
| 2,612,852 | Morrison | Oct. 7, 1952 |
| 2,753,907 | Schmidt et al. | July 10, 1956 |
| 2,811,997 | Schmidt et al. | Nov. 5, 1957 |
| 2,941,560 | McCaffery | June 21, 1960 |

FOREIGN PATENTS

| | | |
|---|---|---|
| 983,485 | France | Feb. 14, 1951 |